(12) United States Patent
Kakadia et al.

(10) Patent No.: US 8,806,002 B2
(45) Date of Patent: Aug. 12, 2014

(54) P2P ACTIVITY DETECTION AND MANAGEMENT

(75) Inventors: Deepak Kakadia, Union City, CA (US); Jay J. Lee, San Ramon, CA (US); Thomas H. Tan, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 372 days.

(21) Appl. No.: 13/109,195

(22) Filed: May 17, 2011

(65) Prior Publication Data

US 2012/0297051 A1 Nov. 22, 2012

(51) Int. Cl.
*G06F 15/16* (2006.01)

(52) U.S. Cl.
USPC .......................................... 709/224

(58) Field of Classification Search
CPC ............ H04L 29/08306; H04L 29/08675; H04L 29/08918; H04L 29/08936; H04L 29/08522; H04L 67/104
USPC ......... 709/224, 218, 221, 225, 229, 231, 232, 709/244
See application file for complete search history.

(56) References Cited

U.S. PATENT DOCUMENTS

| | | | |
|---|---|---|---|
| 2006/0253530 A1* | 11/2006 | Wu et al. | 709/204 |
| 2007/0143405 A1* | 6/2007 | Bland et al. | 709/205 |
| 2008/0020775 A1* | 1/2008 | Willars | 455/445 |
| 2011/0208722 A1* | 8/2011 | Hannuksela | 707/723 |

* cited by examiner

*Primary Examiner* — Mark Rinehart
*Assistant Examiner* — Ellen A Kirillova

(57) ABSTRACT

A network device may receive a peer-to-peer (P2P) activity record corresponding to a P2P data flow of P2P activity in a network. The P2P data flow may include content information communicated from a first user equipment device (UE) to a second UE via the network, and the P2P activity record may include information identifying the P2P data flow. The network device may insert the information identifying the P2P data flow into a P2P activity map and compare the P2P activity map to a P2P pattern of interest. The network device may also determine a P2P activity of interest probability based on the comparison of the P2P activity map to the P2P pattern of interest, which may describe the likelihood that P2P activity of interest is occurring in the network. The network device may also generate a system response based on the P2P activity of interest probability.

20 Claims, 14 Drawing Sheets

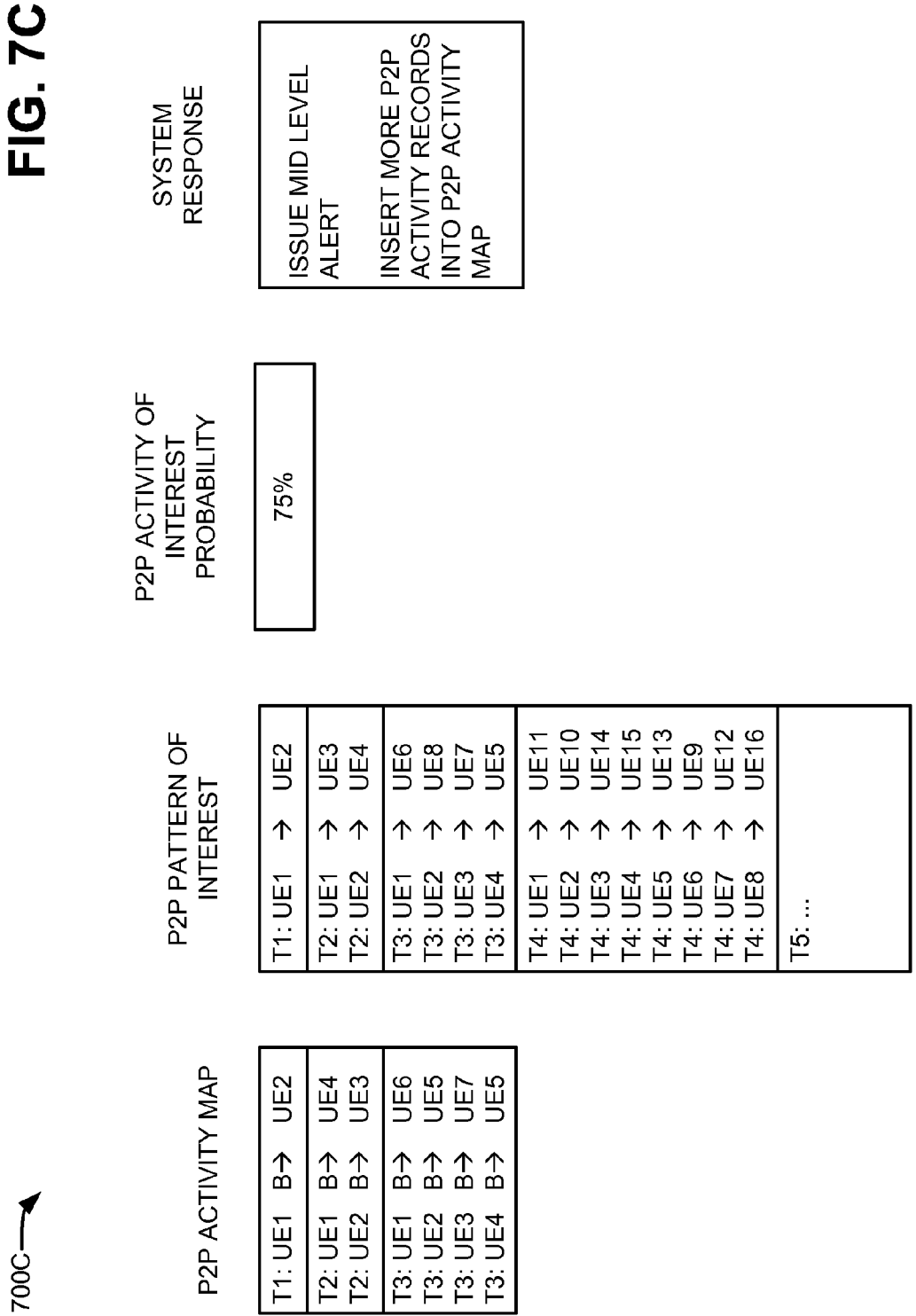

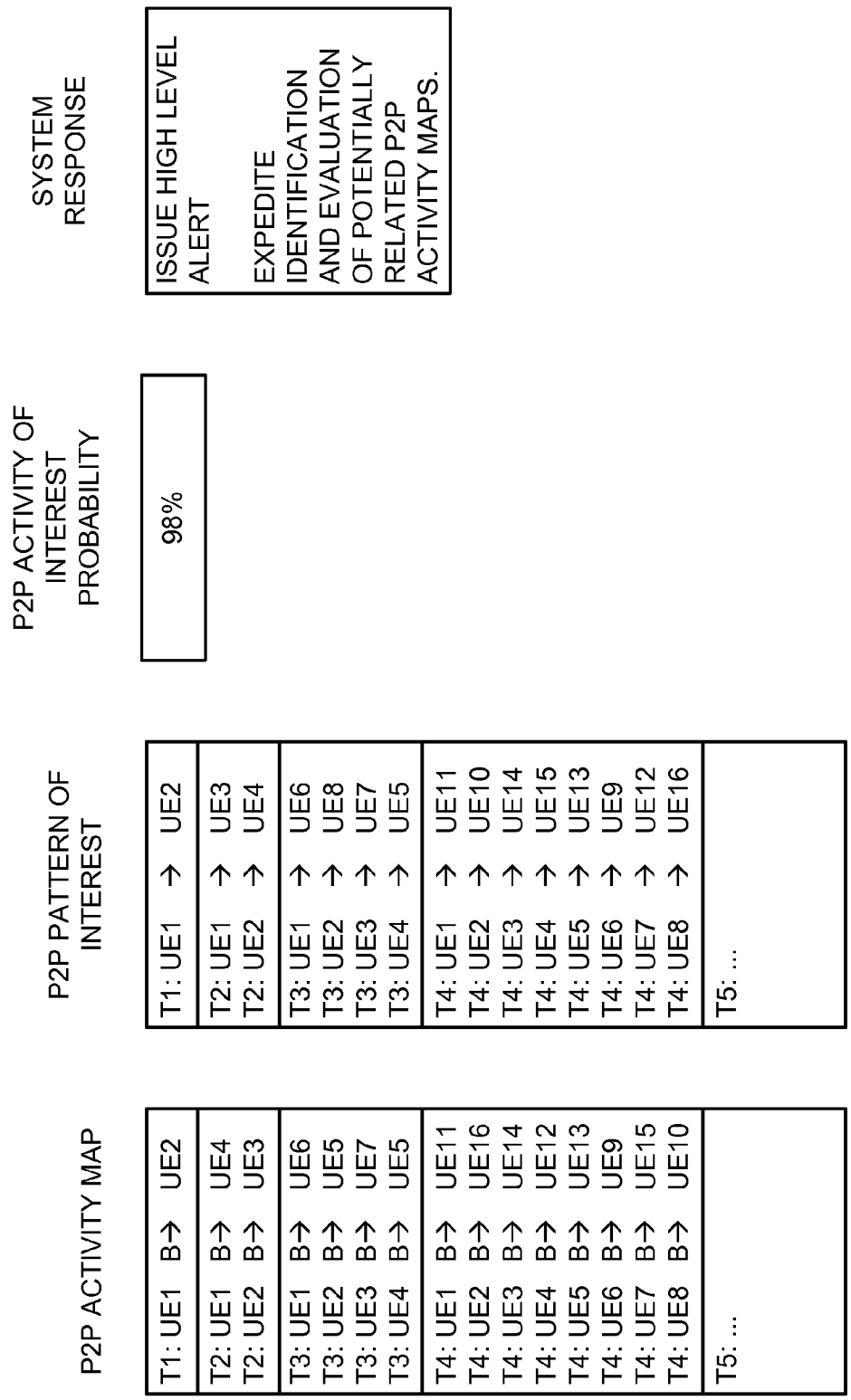

FIG. 10

P2P ACTIVITY OF INTEREST PROBABILITY

| T1: | 1% |
| T2: | 30% |
| T3: | 10% |
| T4: | 0% |
| T5: | ......... |

P2P PATTERN OF INTEREST

| T1: UE1 | → | UE2 |
| T2: UE1 | → | UE3 |
| T2: UE2 | → | UE4 |
| T3: UE1 | → | UE6 |
| T3: UE2 | → | UE8 |
| T3: UE3 | → | UE7 |
| T3: UE4 | → | UE5 |
| T4: UE1 | → | UE11 |
| T4: UE2 | → | UE10 |
| T4: UE3 | → | UE14 |
| T4: UE4 | → | UE15 |
| T4: UE5 | → | UE13 |
| T4: UE6 | → | UE9 |
| T4: UE7 | → | UE12 |
| T4: UE8 | → | UE16 |
| T5: | ......... | |

P2P ACTIVITY MAP

| T1: UE1 | C→ | UE2 |
| T2: UE1 | C→ | UE3 |
| T2: UE2 | C→ | UE4 |
| T3: UE3 | C→ | UE6 |
| T4: UE1 | C→ | UE2 |
| T5: | ......... | |

| P2P ACTIVITY MAP |
|---|
| T1: UE1 D→ UE2 |
| T2: UE1 D→ UE3 |
| T3: UE1 D→ UE4 |
| T3: UE2 D→ UE5 |
| T4: UE1 D→ UE8 |
| T4: UE2 D→ UE10 |
| T4: UE3 D→ UE6 |
| T4: UE4 D→ UE7 |
| T4: UE5 D→ UE9 |
| T5: ............. |

| P2P PATTERN OF INTEREST |
|---|
| T1: UE1 → UE2 |
| T2: UE1 → UE3 |
| T2: UE2 → UE4 |
| T3: UE1 → UE6 |
| T3: UE2 → UE8 |
| T3: UE3 → UE7 |
| T3: UE4 → UE5 |
| T4: UE1 → UE11 |
| T4: UE2 → UE10 |
| T4: UE3 → UE14 |
| T4: UE4 → UE15 |
| T4: UE5 → UE13 |
| T4: UE6 → UE9 |
| T4: UE7 → UE12 |
| T4: UE8 → UE16 |
| T5: ............. |

| P2P ACTIVITY OF INTEREST PROBABILITY |
|---|
| T1: 1% |
| T2: 10% |
| T3: 35% |
| T4: 85% |
| T5: ............. |

1100

P2P ACTIVITY DETECTION AND MANAGEMENT

BACKGROUND

Currently available network technologies include wide area networks (WANs), such as the Internet and a variety of wireless networks. In such networks, a considerable amount of network resources are often required to handle peer-to-peer (P2P) activities. However, while some P2P activities are considered to be proper or legitimate uses of network resources, a significant portion of P2P activities are considered to be improper or illegitimate uses of network resources, such as the use of P2P file sharing programs to download and distribute copyrighted music, images, videos, or software.

BRIEF DESCRIPTION OF THE DRAWINGS

FIGS. 7A-7D are diagrams of example data structures corresponding to one or more systems and/or methods described herein;

FIG. 10 is a diagram of example data structures corresponding to one or more systems and/or methods described herein; and FIG. 11 is a diagram of example data structures corresponding to one or more systems and/or methods described herein.

DETAILED DESCRIPTION OF PREFERRED EMBODIMENTS

The following detailed description refers to the accompanying drawings. The same reference numbers in different drawings may identify the same or similar elements.

In one or more implementations, described herein, devices may be used to detect and prevent P2P file sharing in a network. In certain implementations, a network monitoring point (NMP) may monitor P2P data flows corresponding to P2P activity in a network and generate P2P activity records corresponding to the P2P data flows. A P2P network management server (PNMS) may receive the P2P activity records and compare the P2P activity records to a P2P pattern of interest to determine whether a P2P activity of interest, such as P2P file sharing, is occurring in the network. The network server may respond to P2P activity in a variety of ways, including notifying the network of the P2P activity, communicating warning messages to one or more user equipment devices (UEs) participating in the P2P activity, or preventing additional P2P data flows corresponding to the P2P activity. In some implementations, preventing additional P2P data flows may include manually preventing P2P data flows or programmatically installing Access Control List (ACL) rules in a firewall.

Figure 1:
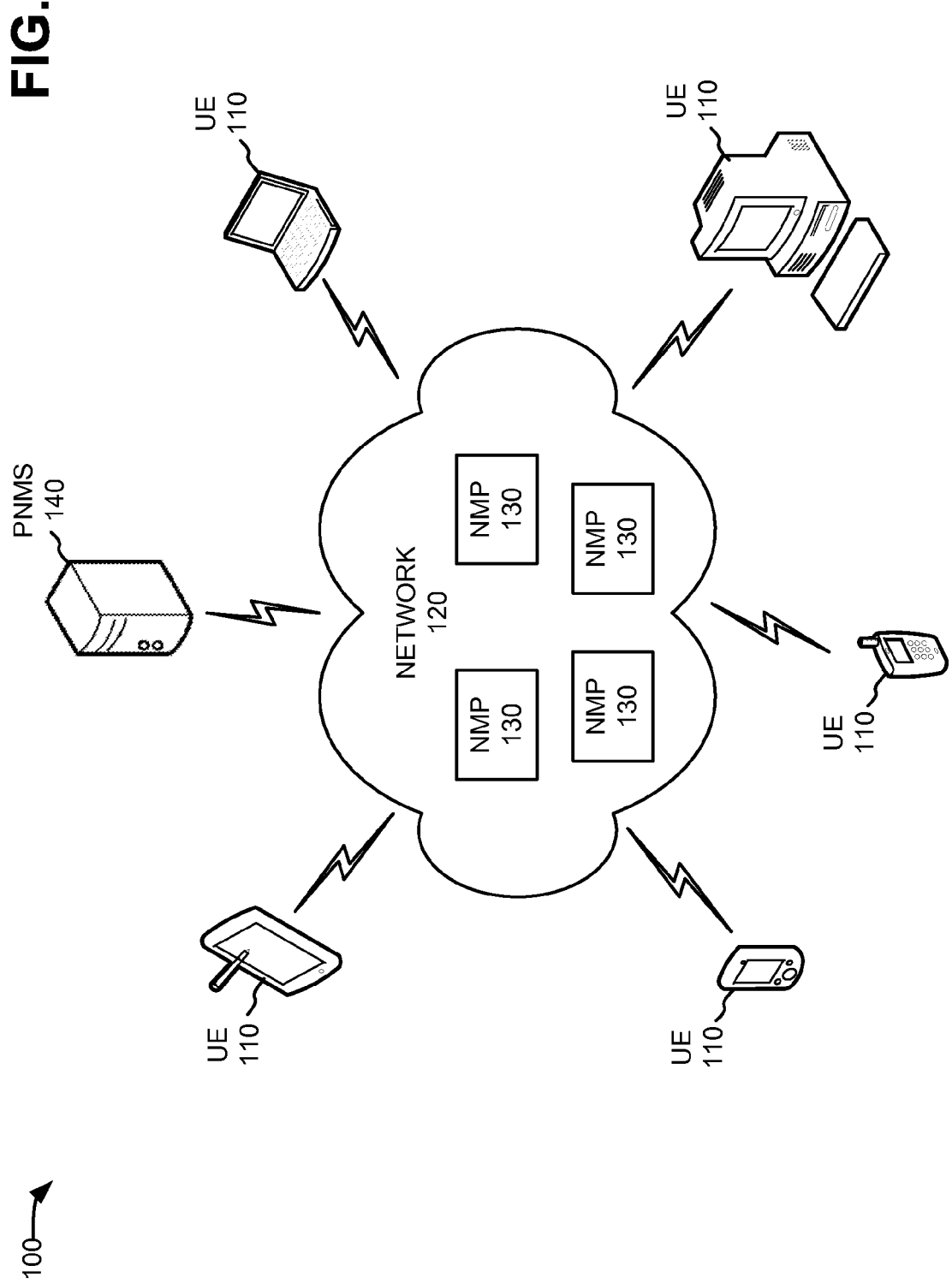
FIG. 1 is a diagram of an overview of an implementation described herein.

FIG. 1 is a diagram of an overview of one or more implementations described herein. As depicted, UEs 110 may include a variety of user devices capable of network communications. For example, UEs 110 may include telephones, smart phones, laptop computers, tablet computers, desktop computers, personal digital assistants (PDAs), and other electronic devices.

Network 120 may be any type of network or combination of networks. For example, network 120 may include a local area network (LAN), a WAN (e.g., the Internet), one or more telecommunication networks, a metropolitan area network (MAN), an ad hoc network, a telephone network (e.g., a Public Switched Telephone Network (PSTN)), a cellular network, or a voice-over-IP (VoIP) network. NMPs 130 may include one or more network devices, such as computers, servers, proxy servers, gateways, routers, modems, switches, hubs, or other devices capable of operating in a network environment. PNMS 140 may also include one or more network devices, such as a computer, a server, and/or a cluster of servers.

In some implementations, UEs 110 may engage in a variety of P2P activities, such as instant messaging, telephone calls, video conferencing, or P2P file sharing. P2P activity may involve transmitting flows of data (referred to herein as P2P data flows) from one UE 110 to another UE 110 via network 120. NMPs 130 may be positioned at various locations within network 120 to monitor and/or collect the P2P data flows. NMPs 130 may generate P2P activity records based on the P2P data flows. NMPs 130 may also, or alternatively, communicate P2P activity records to PNMS 140, and PNMS 140 may evaluate the P2P activity records to determine whether P2P activity of interest is occurring in network 120.

P2P activity of interest may include any type of P2P activity. In some implementations, P2P activity of interest may include multiple types of P2P activity, while in other implementations P2P activity of interest may only include one type of P2P activity. For example, in some implementations, P2P activity of interest may only include P2P activity prohibited or discouraged in network 120 (e.g., P2P file sharing). In such implementations, PNMS 140 may evaluate P2P activity records for evidence of P2P file sharing without regard to other P2P activity, such as instant messaging, video conferencing, etc.

PNMS 140 may respond to P2P activity in one or more of a variety of ways. In some implementations, the manner in which PNMS 140 responds to P2P activity may depend on, for example, a level of confidence or probability that the P2P activity corresponds to P2P activity of interest, the type of P2P activity, the severity of the P2P activity, a current level of traffic within network 120, a history of analogous P2P activity, and/or other factors. Information relating to P2P activity, P2P activity of interest, P2P activity histories and other information relating to P2P activities may be collected, stored, and/or managed by a number of network devices, including PNMS 140 and NMP memory 230. Examples of responses to P2P activity of interest by PNMS 140 include notifying network 120 of the P2P activity, communicating warning messages to UEs 110 involved, or preventing subsequent data flows corresponding to the P2P activity of interest.

Figure 2:
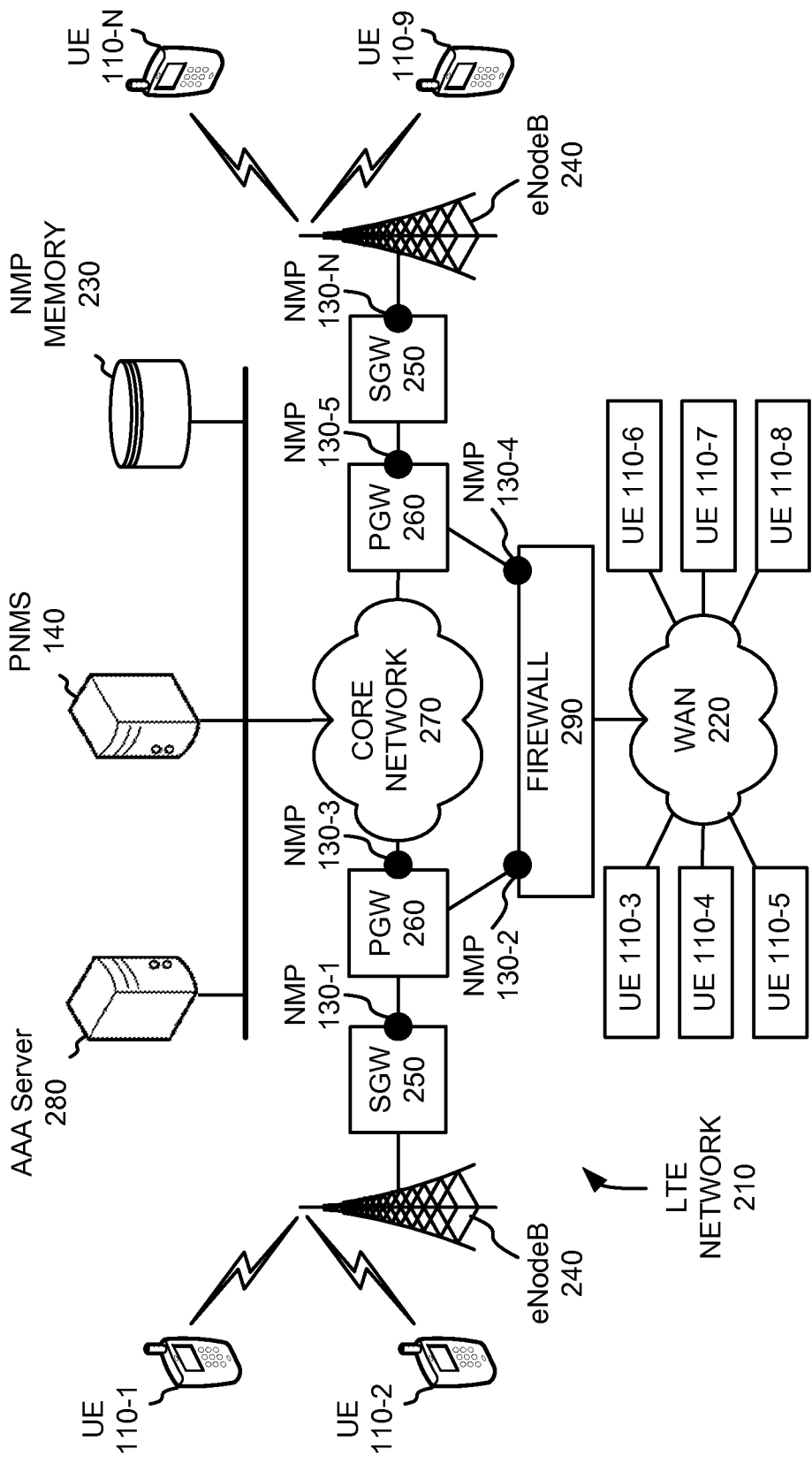
FIG. 2 is a diagram that illustrates an example environment in which systems and/or methods, described herein, may be implemented.

FIG. 2 is a diagram that illustrates an example environment 200 in which systems and/or methods, described herein, may be implemented. As shown in FIG. 2, environment 200 may include UEs 110-1, 110-2, . . . , 110-N (where N≥1) (collectively referred to as "UEs 110," and individually as "UE 110"), Long-Term Evolution (LTE) network 210, and WAN 220. As discussed below, LTE network 210 may include various network devices, such as eNodeBs 240, serving gateways (SGWs) 250, public data network gateways (PDN Gateways, PGWs) 260, core network 270, authentication, authorization, and accounting (AAA) server 280, and firewall 290. In some implementations, NMPs 130, PNMS 140, and NMP memory 230 may also be part of the LTE network 210. While FIG. 2 shows a particular number and arrangement of networks and devices, in alternative implementations, environment 200 may include additional, fewer networks or devices, different networks or devices, or differently arranged networks or devices than those depicted.

As mentioned above, UEs 110 may include a variety of devices, including telephones, smart phones, laptop computers, tablet computers, desktop computers, PDAs, and/or other electronic devices. Some UEs 110 may be connected to LTE network 210, and other UEs 110 may be connected to WAN 220. Similarly, NMPs 130 may include one or more devices, including computers, servers, proxy servers, gateways, routers, modems, switches, or hubs. In some implementations, NMPs 130 may be located at an ingress and/or an egress of one or more network devices. In certain implementations, NMP 130 may passively listen for packets (e.g., packet sniffing) passing along network connections. PNMS 140 may include one or more network devices, including a computer, a server, and/or a cluster of servers. NMPs 130 and PNMS 140 may be connected to NMP memory 230, which may be designated to store P2P activity records created by NMPs 130. In other implementations, NMP memory 230 may be part of PNMS 140.

LTE network 210 may include one or more eNodeBs 240. Each eNodeB 240 may include an LTE base station that covers a geographic area serviced by LTE network 210. Each eNodeB 240 may include one or more devices that receive information from LTE network devices and/or devices that transmit information to UEs 110 via an air interface. Each eNodeB 240 may also include one or more devices that receive information from UEs 110 via an air interface and/or that transmit the information to other LTE network devices.

LTE network 210 may also include one or more SGWs 250. An SGW 250 may manage UE data connections and operate to route or forward UE data packets through LTE network 210. An SGW 250 may operate as an anchor during handovers between eNodeBs 240 and between LTE and other 3GPP technologies. LTE network 210 may also include PGWs 260. PGW 260 may provide UEs 110 of LTE network 210 an Internet Protocol (IP) endpoint. As depicted, in some implementations, NMPs 130 may be located at an ingress and/or an egress of one or more SGWs 250 and/or PGWs 260.

In one implementation, LTE network 210 may include a core network architecture of the Third Generation Partnership Project (3GPP) LTE wireless communication standard (e.g., an evolved packet core (EPC) network). LTE network 210 may include a packet-switched core network 270 that supports high-speed wireless and wired broadband access technologies. AAA server 280 may include one or more servers that provide network services relating to authenticating network identities (IDs), verifying network authorizations, and monitoring network resources. Firewall 290 may include a device or set of devices providing security services regarding transmissions between LTE network 210 and WAN 220. As depicted, in some implementations, NMPs 130 may also be located at an ingress and/or egress of firewall 290. LTE network 210 may also include other network devices (not shown), such as a mobility management entity (MME), subscriber servers, and other network devices.

While implementations herein are described primarily in the context of broadband services via LTE, other wireless protocols and technologies may alternatively be used. For example, devices and components conforming to LTE standards described herein may be replaced by devices or components conforming to other network protocols (e.g., Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), or other network protocols).

Although FIG. 2 shows example networks and devices of environment 200, in other implementations, environment 200 may include fewer networks or devices, different networks or devices, differently arranged networks or devices, and/or additional networks or devices than those depicted in FIG. 2. Alternatively, or additionally, one or more networks or devices of environment 200 may perform one or more tasks described as being performed by one or more other networks or devices of environment 200.

Figure 3:
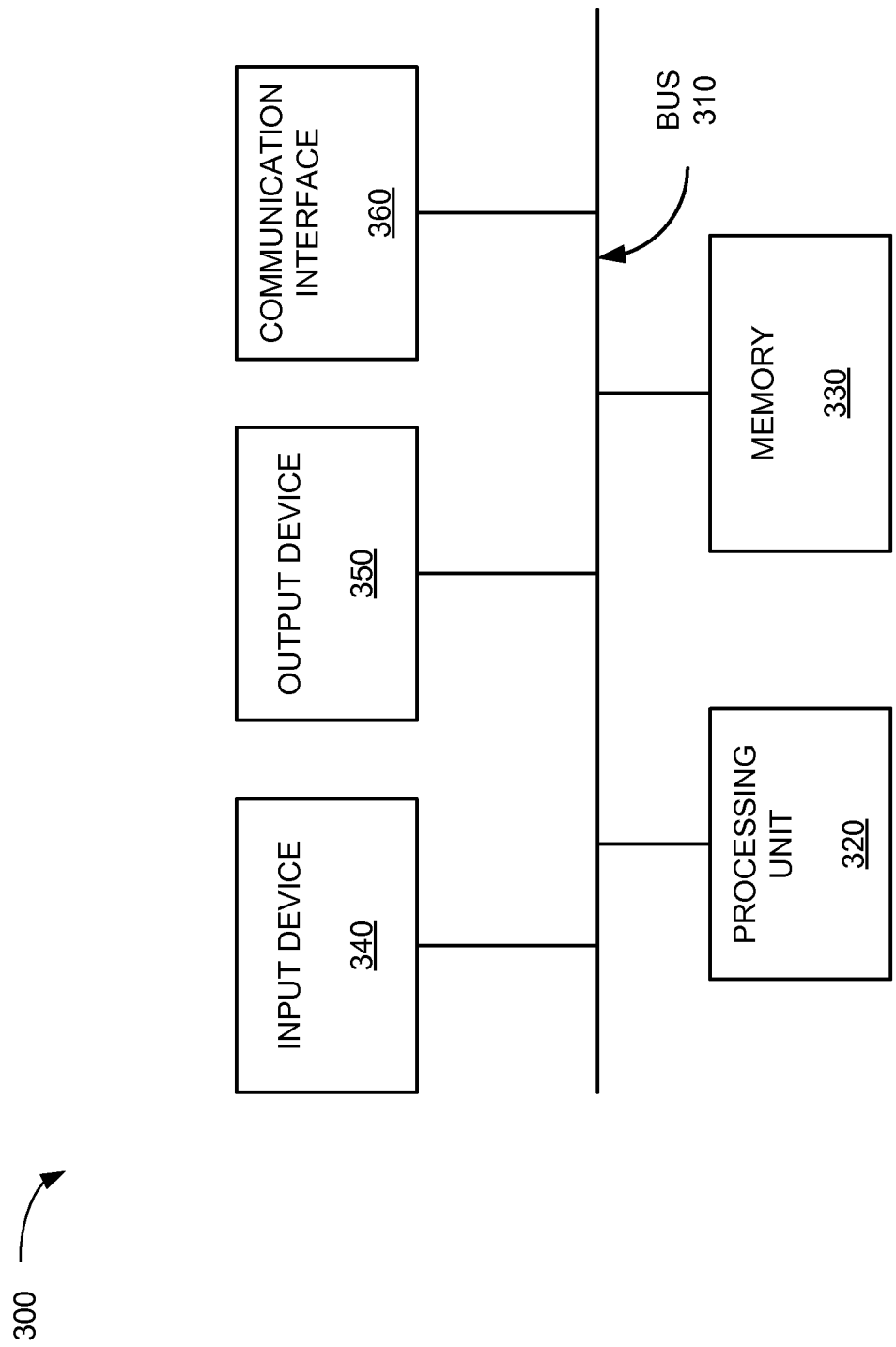
FIG. 3 is a diagram of example components of one or more devices that may be used within the environment of FIG. 2.

FIG. 3 is a diagram of example components of device 300 that may be used within environment of FIG. 2. For example, device 300 may correspond to UE 110, NMP 130, PNMS 140, AAA server 250, and/or NMP memory 230. Each of UE 110, NMP 130, PNMS 140, AAA server 250, and/or NMP memory 230 may include one or more devices 300 and/or one or more of the components of device 300. As depicted, device 300 includes bus 310, processing unit 320, memory 330, input device 340, output device 350, and communication interface 360. However, the precise components of device 300 may vary between implementations. For example, depending on the implementation, device 300 may include fewer components, additional components, different components, or differently arranged components than those illustrated in FIG. 3.

Bus 310 may permit communication among the components of device 300. Processing unit 320 may include one or more processors, microprocessors, data processors, co-processors, network processors, application-specific integrated circuits (ASICs), controllers, programmable logic devices (PLDs), chipsets, field-programmable gate arrays (FPGAs), or other components that may interpret or execute instructions or data. Processing unit 320 may control the overall operation, or a portion thereof, of device 300, based on, for example, an operating system (not illustrated) and/or various applications. Processing unit 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

Memory 330 may store data, applications or instructions related to the operation of device 300. For example, memory 330 may include a variety of applications, such as a navigation application, an e-mail application, a telephone application, a camera application, a voice recognition application, a multi-media application, a music player application, a visual voicemail application, a contacts application, a data organizer application, a calendar application, an instant messaging application, a texting application, a web browsing application, a blogging application or other types of applications (e.g., a word processing application, a spreadsheet application, etc.).

Input device 340 may include one or more components that permit a user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices (e.g., UEs 110, NMPs 130, PNMS 140, AAA server 280, etc.) or networks (e.g., network 120, LTE network 210, or WAN 220). For example, communication interface 360 may include some type of wireless or wired interface. Communication interface 330 may also include an antenna (or a set of antennas) that permit wireless communication, such as the transmission and reception of radio frequency (RF) signals.

As described herein, device 300 may perform certain operations in response to processing unit 320 executing software instructions contained in a computer-readable medium, such as memory 330. The software instructions may be read into memory 330 from another computer-readable medium or from another device via communication interface 360. The software instructions contained in memory 330 may cause processing unit 320 to perform one or more processes described herein. Alternatively, hardwired circuitry may be used in place of, or in combination with, software instructions to implement processes described herein. Thus, implementations described herein are not limited to any specific combination of hardware circuitry and software.

Figure 4:
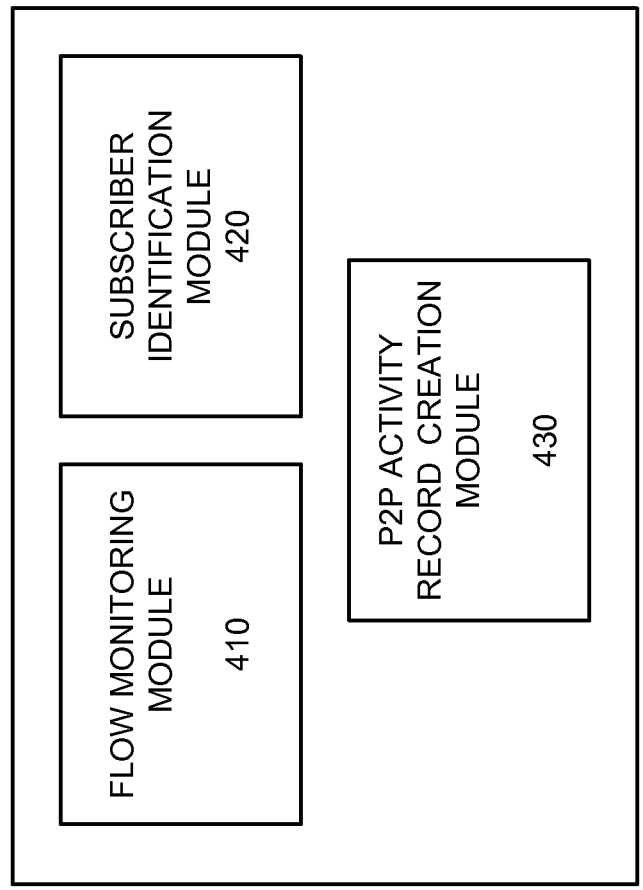
FIG. 4 is a diagram of example functional components of a network monitoring point (NMP) that may be used within the environment of FIG. 2.

FIG. 4 is a diagram of example functional components of NMP 130. As illustrated, NMP 130 may include flow monitoring module 410, subscriber identification module 420, and P2P activity record creation module 430. Depending on the implementation, one or more of the modules 410-430 may be implemented as a combination of hardware and software based on the components illustrated and described with respect to FIG. 3. Alternatively, modules 410-430 may each be implemented as hardware based on the components illustrated and described with respect to FIG. 3. While FIG. 4 shows a particular number and arrangement of modules, in alternative implementations, NMP 130 may include additional modules, fewer modules, different modules, or differently arranged modules than those depicted.

Flow monitoring module 410 may monitor, or enable the monitoring of, P2P data flows. For example, flow monitoring module 410 may enable one or more NMPs 130 to monitor P2P data flows in network 120. In some implementations, a P2P data flow may include information being sent from one UE 110 to another UE 110 over network 120. A P2P data flow may include source and destination information, such as a source IP address and a destination IP address, or other information representing an origin and/or an intended destination of the P2P data flow. A P2P data flow may also, or alternatively, include content information, such as one or more audio files, image files, video files, software applications, documents, or portions thereof. Additionally, or alternatively, a P2P data flow may include timing information, such as a timestamp or other form of timing information. A P2P data flow may include a variety of information in addition to the information described, including formatting data, protocol data, authentication data, and/or other data relating to data being transmitted over network 120.

Subscriber identification module 420 may obtain, or enable the identification, acquisition, and/or retrieval of, subscriber identifiers (IDs) (described below). For example, in some implementations, subscriber identification module 420 may enable NMP 130 to obtain subscriber IDs corresponding to one or more P2P data flows. In some implementations, adequate subscriber identification information may be located in a P2P data flow. However, in other implementations, subscriber identification module 420 may obtain one or more subscriber IDs by communicating with a network device, such as AAA server 280. For example, subscriber identification module 420 may retrieve a source IP address in a P2P data flow, communicate the source IP address to AAA server 280, and receive a subscriber ID in response thereto. In some implementations, subscriber identification module 420 may also do this for the destination IP address. This approach may be used in network environments where IP addresses of UEs 110 are not static.

P2P activity record creation module 430 may create, or enable the creation of, P2P activity records. For instance, P2P activity record creation module 430 may enable NMP 130 to generate P2P activity records from P2P data flows. In some implementations, P2P activity record creation module 430 may also, or alternatively enable P2P activity records to be transmitted to other devices, such as PNMS 140 or NMP memory 230.

A P2P activity record may include a variety of data, including a subscriber ID, a flow ID, a source ID, a destination ID, and timing information. A subscriber ID may include a variety of information. For example, in some implementations, a subscriber ID may be an IP address of a UE 110, while in other implementations, a subscriber ID may be an alternative data structure, such as an international mobile subscriber ID (IMSI), that uniquely, or at least adequately, identifies a particular UE 110.

A flow ID may also include a variety of information. For example, in some implementations, a flow ID may include information capable of being used to determine whether separate P2P data flows are carrying or transferring the same or sufficiently similar content (e.g., the same audio file, image file, video file, software program, document, or portion thereof). For example, a flow ID may be used to determine whether a P2P data flow from a first UE 110 to a second UE 110 involves the same or similar content as a P2P data flow from a third UE 110 to a fourth UE 110.

A source ID may include an IP address or other identifying information corresponding to a UE 110 that has communicated data to another UE 110. Similarly, a destination ID may include an IP address or other identifying information corresponding to a UE 110 receiving data from another UE 110. In some implementations, the subscriber ID and the source ID may correspond to the same UE 110. In other implementations, the subscriber ID and the source ID may correspond to different UEs 110.

Similarly, timing information may include a variety of data. For instance, in some implementations, timing information may be a timestamp associated with a P2P data flow. However, timing information may also, or alternatively, include other forms or types of data representing a creation time, a transmission time, a reception time, or other timing information associated with a P2P data flow. In some implementations, timing information may be a timestamp representing the time at which a P2P data flow was transmitted from UE 110. In certain implementations, timing information may include a sequence number identifying the order of the data within the flow.

Figure 5:
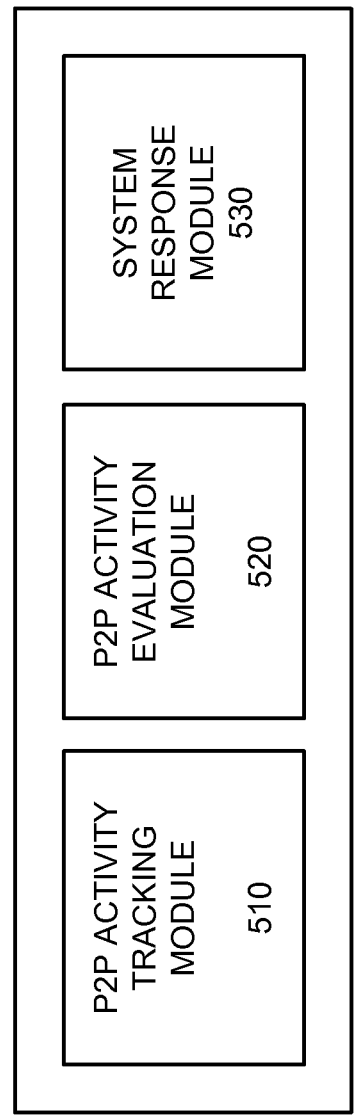
FIG. 5 is a diagram of example components of a P2P network management system (PNMS) that may be used within the environment of FIG. 2.

FIG. 5 is a diagram of example functional components of PNMS 140. As illustrated, PNMS 140 may include P2P activity tracking module 510, P2P activity evaluation module 520, and system response module 530. Depending on the implementation, one or more of the modules 510-530 may be implemented as a combination of hardware and software based on the components illustrated and described with respect to FIG. 3. Alternatively, modules 510-530 may each be implemented as hardware based on the components illustrated and described with respect to FIG. 3. While FIG. 5 shows a particular number and arrangement of modules, in alternative implementations, PNMS 140 may include additional modules, fewer modules, different modules, or differently arranged modules than those depicted. FIG. 5 will be described with corresponding references to example P2P activity maps 600 illustrated in FIG. 6. Additionally, the description of FIG. 5 will be followed by a description of FIGS. 7A-7D, which provide examples of data structures and operations that may be relevant to the description of FIG. 5.

P2P activity tracking module 510 may receive, or enable the reception of, P2P activity records. For example, P2P activity tracking module 510 may enable PNMS 140 to receive P2P activity records from one or more sources, including one or more NMPs 130 and/or NMP memory 230. As mentioned above, P2P activity records may include a variety of data, including a subscriber ID, a flow ID, a source ID, a destination ID, and timing information.

Additionally, or alternatively, P2P activity tracking module 510 may track, or enable the tracking of, P2P activity. For example, P2P activity tracking module 510 may enable PNMS 140 to map, monitor, or otherwise track the P2P activity of one or more UEs 110 in network 120. In some implementations, this may include PNMS 140 creating, maintaining, monitoring, and/or managing one or more P2P activity maps.

Figure 6:
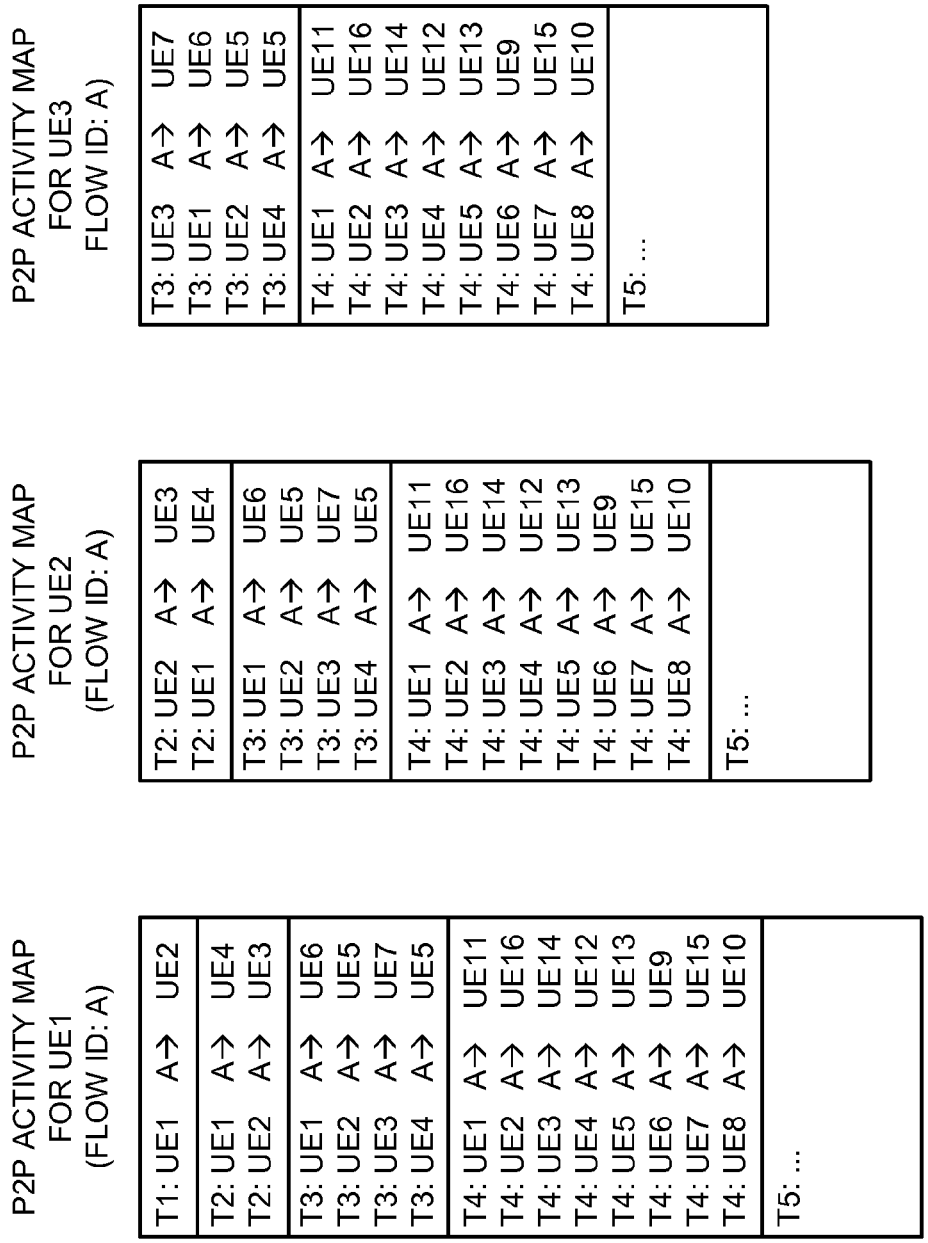
FIG. 6 is a diagram of example P2P activity maps corresponding to one or more systems and/or methods described herein.

FIG. 6 is a diagram of example P2P activity maps 600 according to one or more implementations discussed herein. As depicted, P2P activity maps 600 include a P2P activity map for UE1, a P2P activity map for UE2, and a P2P activity map for UE3. P2P activity maps 600 each include P2P activity records (e.g., "T1: UE1 A→UE2"), and each P2P activity record may represent a P2P data flow (→) involving a particular data structure (A) being communicated from one UE (e.g., UE1) to another UE (e.g., UE2) at a particular time (e.g., T1). In some implementations, UE1 and UE2 may be subscriber IDs (and/or source and destination IDs), data structure A may be a flow ID, and/or T1 may be timing information. While P2P activity maps 600 are associated with different UEs (e.g., UE1, UE2, and UE3), each UE, in this example, happens to be participating in the same overall P2P activity (e.g., sharing data structure A).

For example, PNMS 140 may receive a first P2P activity record ("T1: UE1 A→UE2") indicating the transmission of data structure A from UE1 to UE2 at T1. Since this P2P activity record indicates that UE1 originated the P2P data flow represented by the P2P activity record, PNMS 140 may insert the P2P activity record into the P2P activity map for UE1, as illustrated. PNMS 140 may also associate the P2P activity map for UE1 with data structure A, so that additional P2P activity records involving data structure A may be inserted into the P2P activity map for UE1, regardless of whether UE1 is actually referenced in the P2P activity record. Data structure A may be a flow ID in some implementations. In this example, the P2P activity maps for UE2 and UE3 may not receive the P2P activity record "T1: UE1→UE2" since neither UE2 nor UE3 originated the P2P data flow represented by the P2P activity record.

PNMS 140 may receive two more P2P activity records "T2: UE1 A→UE4" and "T2: UE2 A→UE3." As shown in FIG. 6, PNMS 140 may insert the two P2P activity records into the P2P activity map for UE1 since UE1 has been associated with data structure A and both P2P activity records include an identifier for data structure A. PNMS 140 may also insert P2P activity record "T2: UE2 A→UE3" into the P2P activity map for UE2 since UE2 is represented in the P2P activity record as the originator. Similar to UE1, PNMS 140 may also associate UE2 with data structure A so that P2P activity records involving data structure A may be inserted into the P2P activity map for UE2. As a result, PNMS 140 may also insert P2P activity record "T2: UE1 A→UE4" into the P2P activity map for UE2. In this example, PNMS 140 may not insert the P2P activity records into the P2P activity map for UE3 since UE3 did not originate either of the data flows.

As depicted by the additional P2P activity records in FIG. 6 (e.g., "T3: UE3 A→UE7," "T3: UE1 A→UE6," "T3: UE2 A→UE5," etc.), PNMS 140 may receive and insert additional P2P activity records into P2P activity maps 600. PNMS 140 may do so by performing one or more of the operations described above or by performing fewer, additional, or alternative operations.

For example, in some implementations, PNMS 140 may also insert P2P activity record "T1: UE1→UE2" into the P2P activity map for UE2. PNMS 140 may do so based on UE2 being represented in the P2P activity record as a destination UE. Alternatively, PNMS 140 may insert P2P activity record "T1: UE1 A→UE2" into the P2P activity map for UE2 retroactively (e.g., once UE2 has been associated with data structure A at T2). In a similar fashion, PNMS 140 may also add P2P activity records to the P2P activity map for UE3.

Also, since UE 110 may be capable of participating in multiple P2P activities simultaneously, PNMS 140 may be actively managing several P2P activity maps for the same UE 110. By contrast, PNMS 140 may also be actively managing several P2P activity maps corresponding to UEs 110 participating in the same overall P2P activity, as shown in FIG. 6 by the repeated sharing of data structure A. In some implementations, PNMS 140 may be capable of modifying the manner in which P2P activities are tracked, which may include modifying P2P activity records, P2P activity maps, and/or associations between P2P activity records, P2P activity maps, and UEs 110.

For example, PNMS 140 may be capable of using one P2P activity map to analyze the activity of multiple UEs 110. More specifically, upon determining that UE1 has been participating in P2P file sharing, PNMS 140 may analyze the P2P activity map of UE1 to determine whether UE2 and UE3 appear in the P2P activity map in a manner consistent with P2P file sharing activity. As another example, PNMS 140 may link, reference, or create associations between similar P2P activity maps to more efficiently recognize P2P activity of interest. More specifically, PNMS 140 may monitor whether two or more P2P activity maps become more similar or less similar as P2P activity records are added to each P2P activity map. If the similarities between the P2P activity maps exceed a specified threshold, PNMS 140 may consolidate the P2P activity maps by, for example, selecting one of the P2P activity maps and associating multiple UEs 110 to the selected P2P activity map.

Returning now to FIG. 5, P2P activity evaluation module 520 may evaluate, or enable the evaluation of, P2P activity. For example, P2P activity evaluation module 520 may enable PNMS 140 to evaluate P2P activity records to identify whether UEs 110 are engaging in one or more P2P activities of interest (e.g., P2P file sharing). In some implementations, PNMS 140 may evaluate P2P activity by comparing one or more P2P activity maps with one or more P2P patterns of interest.

A P2P pattern of interest may include a sequence of example data flows that each includes an example source, an example destination, and an example time arranged in a manner consistent with a P2P activity of interest. In some implementations, a P2P pattern of interest may be arranged in a manner that corresponds to a P2P activity map. For instance, a P2P pattern of interest may include one or more data structures that represent a P2P data flow between two UEs 110 at a particular time. However, in some implementations, aspects of a P2P pattern of interest may be different from a P2P activity map. For example, a P2P pattern of interest might not be associated with a subscriber ID or a flow ID.

P2P activity evaluation module 520 may determine, or enable the determination of, whether P2P activity of interest is actually occurring. For example, P2P activity evaluation module 520 may enable PNMS 140 to determine a P2P activity of interest probability that indicates a probability that a UE 110 is participating in a particular P2P activity of interest (e.g., P2P file sharing). In some implementations, the P2P activity of interest probability may be based on a comparison of a P2P activity map to a P2P pattern of interest. PNMS 140 may also, or alternatively, make multiple comparisons between multiple P2P activity maps and multiple P2P patterns of interest. Additionally, or alternatively, the P2P activity of interest probability may be based on one or more of a variety of other factors, including a rate of occurrence corresponding to the P2P activity type of a P2P pattern of interest, a rate of occurrence of a subscriber ID being associated with the P2P activity type of a P2P pattern of interest, a rate of occurrence of a flow ID being associated with the P2P activity type of a P2P pattern of interest, whether timing information of a P2P activity record corresponds to peak activity times of the P2P activity type of the P2P pattern of interest.

System response module 530 may generate, or enable the generation of, a response. For example, system response module 530 may enable PNMS 140 to respond to P2P activity in one or more of a variety of ways. Examples of system responses may include communicating an alert message with a level of severity to at least one network device, communicating a warning message to one or more UEs 110 reducing a bandwidth corresponding to one or more UEs 110, terminating network connections corresponding to one or more UEs 110, updating a P2P activity history with information corresponding to P2P activity, prohibiting P2P data flows involving a particular flow ID, expedite the identification and evaluation of potentially relevant P2P activity maps, or determining whether to continue tracking the P2P activity.

In some implementations, PNMS 140 may respond to P2P activity based on a P2P activity of interest probability corresponding to the P2P activity. In other implementations, PNMS 140 may respond to P2P activity based on additional factors, including a threat level associated with the P2P activity type of a P2P pattern of interest, a rate of occurrence corresponding to the P2P activity type of a P2P pattern of interest, a rate of occurrence of a subscriber ID being associated with the P2P activity type of a P2P pattern of interest, a rate of occurrence of a flow ID being associated with the P2P activity type of a P2P pattern of interest, whether timing information of a P2P activity record corresponds to peak activity times of the P2P activity type of a P2P pattern of interest, or a combination of the foregoing.

For example, PNMS 140 may respond to a relatively low probability by issuing a low level alert over the network 120 and inserting additional P2P activity records into one or more P2P activity maps. By contrast, PNMS 140 may respond to a relatively high probability by, for example, issuing a high level alert over network 120, identifying and evaluating P2P activity maps that may be related, updating network usage history information of UEs associated with the high level alert, executing one or more investigative operations to identify additional details or conditions corresponding to the P2P activity, or other operations.

As mentioned above, PNMS 140 may respond to P2P activity by issuing different alert messages which may be categorized or characterized in any variety of ways (e.g., low to high, 0 to 10, blue to red, etc.). Alert messages may be communicated to one or more devices in the network 120 and may result in one or more of a variety of events. For example, a lower level alert may, for example, cause one or more NMPs 130 to place an emphasis or priority on collecting, creating, and communicating P2P activity records that may be relevant to the alert. A mid level alert may, for example, cause a warning message to be sent to UEs 110 involved in the P2P activity, and bandwidths associated with the UEs 110 may be reduced for a period of time (e.g., while additional investigative operations are conducted). A high level alert may, for example, cause network 120 to terminate network connections for one or more UEs 110.

FIGS. 7A-7D are diagrams of example data structures 700 (individually referenced as 700A, 700B, 700C, and 700D) associated with one or more systems and/or methods described herein. In some implementations, one or more of data structures 700 may correspond to one or more methods, processes, or operations executed by device 300 and/or PNMS 140. For example, as discussed below, data structures 700 may correspond to a sequence of operations performed by PNMS 140, including inserting P2P activity records into a P2P activity map, comparing the P2P activity map to a P2P pattern of interest, determining a P2P activity of interest probability, and generating a system response. However, in other implementations, one or more of data structures 700 may correspond to one or more other components/devices, or a group of components/devices, including or excluding device 300 and/or PNMS 140.

Figure 7A:
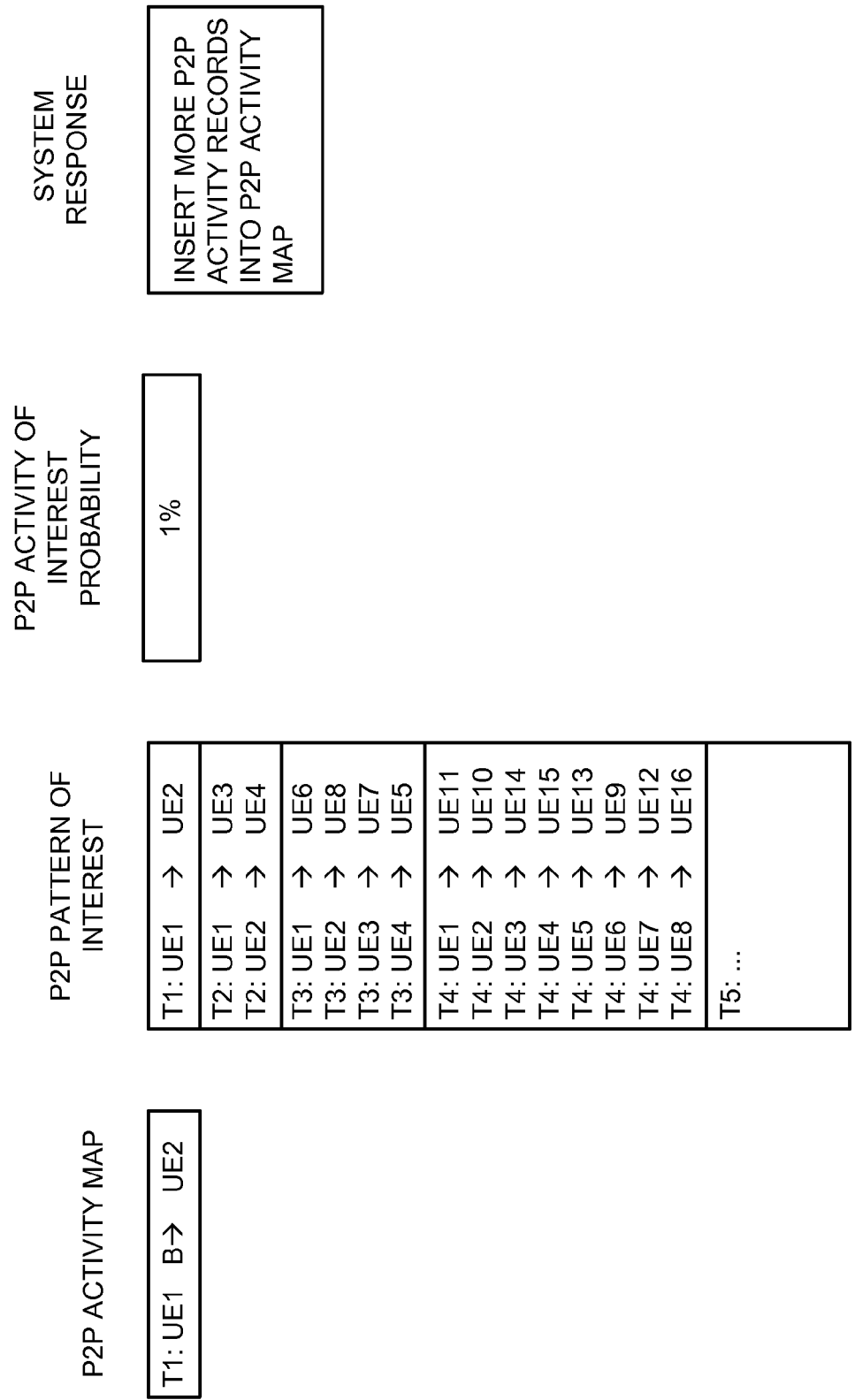

Referring to FIG. 7A, PNMS 140 may insert P2P activity record "T1: UE 1 B→UE2" into the P2P activity map. The P2P activity record may represent a P2P data flow (→)involving a particular data structure (B) being communicated from one UE (e.g., UE1) to another UE (e.g., UE2) at a particular time (e.g., T1). Additionally, PNMS 140 may evaluate the P2P activity map by comparing the P2P activity map to the P2P pattern of interest and determining a P2P activity of interest probability.

As shown, the P2P pattern of interest may include a series of P2P data flow models that are arranged or formatted in a manner consistent or complementary to a P2P activity of interest and/or a P2P activity map. For example, similar to the P2P activity map, each entry (e.g., P2P data flow model)

depicted in the P2P pattern of interest represents a P2P data flow (→) from one UE (e.g., UE1) to another UE (e.g., UE2) at a particular time (e.g., T1). As such, PNMS 140 may evaluate the P2P activity map by comparing the P2P activity map to the P2P pattern of interest and determining a P2P activity of interest probability.

As shown, while the P2P activity map directly corresponds to the first entry (T1: UE1→UE2) in the P2P pattern of interest, the P2P activity of interest probability may be very low (e.g., 1%). This may be due to a variety of factors, including the P2P activity map having only one P2P activity record which could be attributed to a wide variety of P2P activities that are not of interest. As such, PNMS 140 may respond by inserting more P2P activity records into the P2P activity map.

Figure 7B:
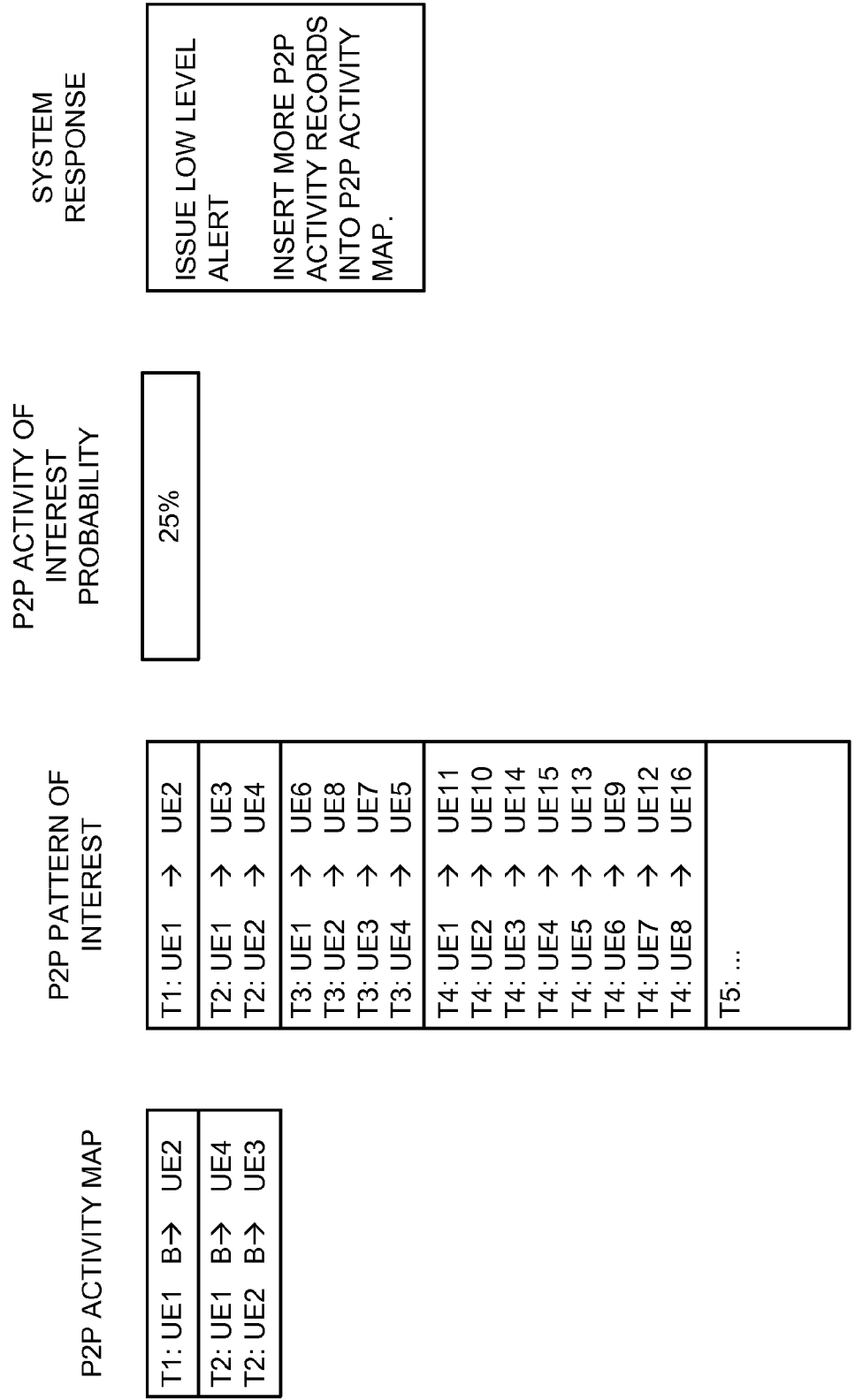

Referring now to FIG. 7B, PNMS 140 may insert additional P2P activity records into the P2P activity map. In some implementations, the number of P2P activity records inserted may be constrained by one or more of a variety of factors. For example, in some implementations, PNMS 140 may be designed to only insert P2P records associated with a time interval that is already represented in the P2P activity map (e.g., T1) or a time interval that is immediately subsequent to a time interval already represented in the P2P activity map (e.g., T2). By contrast, in other implementations, PNMS may insert as many P2P activity records as may be available. In the depicted implementation, two additional P2P activity records are inserted into the P2P activity map, both associated with T2.

PNMS 140 may again compare the P2P activity map with the P2P pattern of interest in order to determine a P2P activity of interest probability. In the depicted example, since the P2P activity records in the P2P activity map and the P2P pattern of interest have more records in common, the P2P activity of interest probability may be increased to 25% (from 1% in FIG. 7A). PNMS 140 may respond to the new P2P activity of interest probability by issuing a low level alert to network 120. PNMS 140 may also respond by inserting more P2P activity records into the P2P activity map.

Referring now to FIG. 7C, PNMS 140 may insert additional P2P activity records into the P2P activity map. In the depicted implementation, the additional P2P activity records each correspond to the same time interval (T3). However, in other implementations, the PNMS 140 may insert fewer, more, or alternative P2P activity records, as discussed above. PNMS 140 may also compare the updated P2P activity map with the P2P pattern of interest to determine a P2P activity of interest probability. Because of, for example, the similarities between the P2P activity map and the P2P pattern of interest, the P2P activity of interest probability is increase to 75% (from 25% in FIG. 7B). Accordingly, PNMS 140 may respond by issuing a mid level alert and inserting more P2P activity records into the P2P activity map.

Referring now to FIG. 7D, PNMS 140 may insert additional P2P activity records into the P2P activity map. In the depicted example, eight new P2P activity records are inserted into the P2P activity map. Additionally, each of the newly inserted P2P activity records corresponds to the same time interval (T4). However, as described above, PNMS 140 may insert fewer, more, or an alternative set of P2P activity records, depending on the implementation. PNMS 140 may also compare the P2P activity map with the P2P pattern of interest to determine a P2P activity of interest probability. Since the P2P activity map is now even more similar to the P2P pattern of interest, the P2P activity of interest probability may be increased to 98%. As a result, PNMS 140 may respond by, for example, issuing a high-level alert and expediting the identification and evaluation of potentially related P2P activity maps. In some implementations, the PNMS 140 may also, or alternatively, insert more P2P activity records into the P2P activity map.

Figure 8:
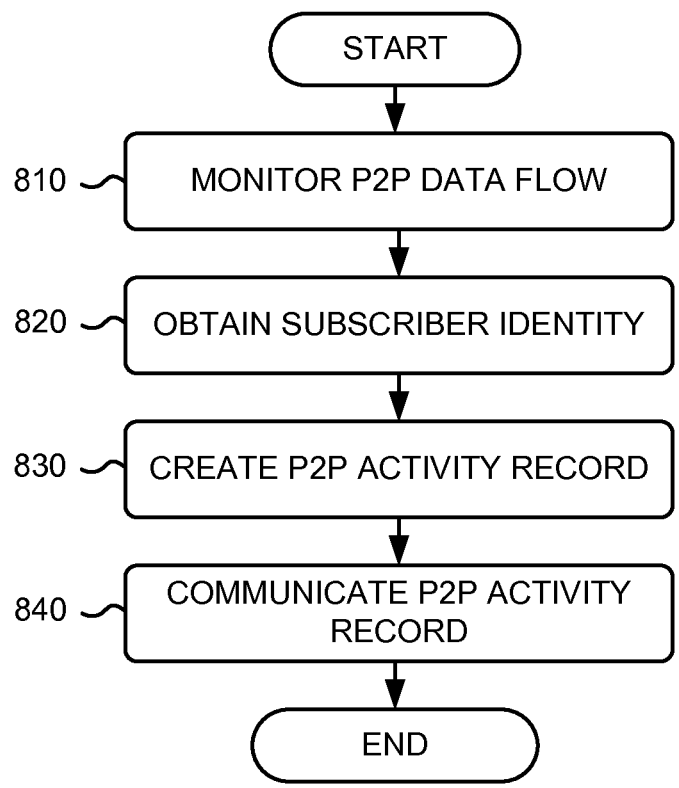
FIG. 8 is a flowchart diagram of an example process for creating P2P activity records.

FIG. 8 is a flowchart of an example process 800 for creating P2P activity records. In one or more implementations, process 800 may be performed by one or more components of NMP 130. In yet another implementation, one or more blocks of process 800 may be performed by one or more other components/devices, or a group of components/devices, including or excluding NMP 130.

Process 800 may include monitoring P2P data flows (block 810). For example, NMP 130 may monitor a data path, distinguish one P2P data flow from another P2P data flow, and analyze each P2P data flow individually. In other implementations, NMP 130 may monitor P2P data flows by, for example, collecting all the data passing along an ingress and/or egress, without distinguishing or recognizing one P2P data flow from another P2P data flow. Additionally, or alternatively, NMP 130 may monitor P2P data flows by collecting, acquiring, or otherwise obtaining timing information, such as a timestamp, corresponding to each monitored P2P data flow. For instance, in implementations where NMP 130 may recognize and monitor each P2P data flow as an individual data set, NMP 130 may collect a specific timestamp for each P2P data flow. By contrast, in implementations where, for example, NMP 130 monitors P2P data flows without distinguishing between data flows, NMP 130 may collect timing information more generally (e.g., without associating a particular timestamp with a particular P2P data flow). In such implementations, individual P2P data flows may be identified and associated with timing information at a later time and/or by a device other than NMP 130.

A subscriber ID may be obtained (block 820). For example, NMP 130 may operate to obtain a subscriber ID corresponding to a P2P data flow. In some implementations, NMP 130 may do so by identifying relevant information in the P2P data flow itself. For instance, NMP 130 may identify a source IP address of the P2P data flow and communicate with one or more network devices, such as AAA server 270, capable of mapping the source IP address to a subscriber ID. In some implementations, identifying a source IP address or other information in the P2P data flow may be adequate or tantamount to obtaining a subscriber ID.

A P2P activity record may be created (block 830). For instance, NMP 130 may generate a P2P activity record that includes a subscriber ID, a flow ID, a source ID, a destination ID, and/or timing information. As discussed above, a subscriber ID and a flow ID may be used to associate a particular P2P activity map with a particular UE 110 and a particular data structure being transferred between UEs 110. Also, a source ID, destination ID, and timing information may be used to represent a particular P2P data flow in a P2P activity map.

Process 800 may include communicating a P2P activity record (block 840). In some implementations, this may include NMP 130 communicating a message containing a P2P activity record to PNMS 140. In other implementations, NMP 130 may communicate the P2P activity record by sending a message containing the P2P activity record directly to NMP memory 230, which may be part of, connected to, or otherwise in communication with PNMS 140.

While FIG. 8 shows a flowchart diagram of an example process 800 for creating P2P activity records, in other implementations, a process for creating P2P activity records may include fewer operations, different operations, differently arranged operations, or additional operations than depicted in FIG. 8.

Figure 9:
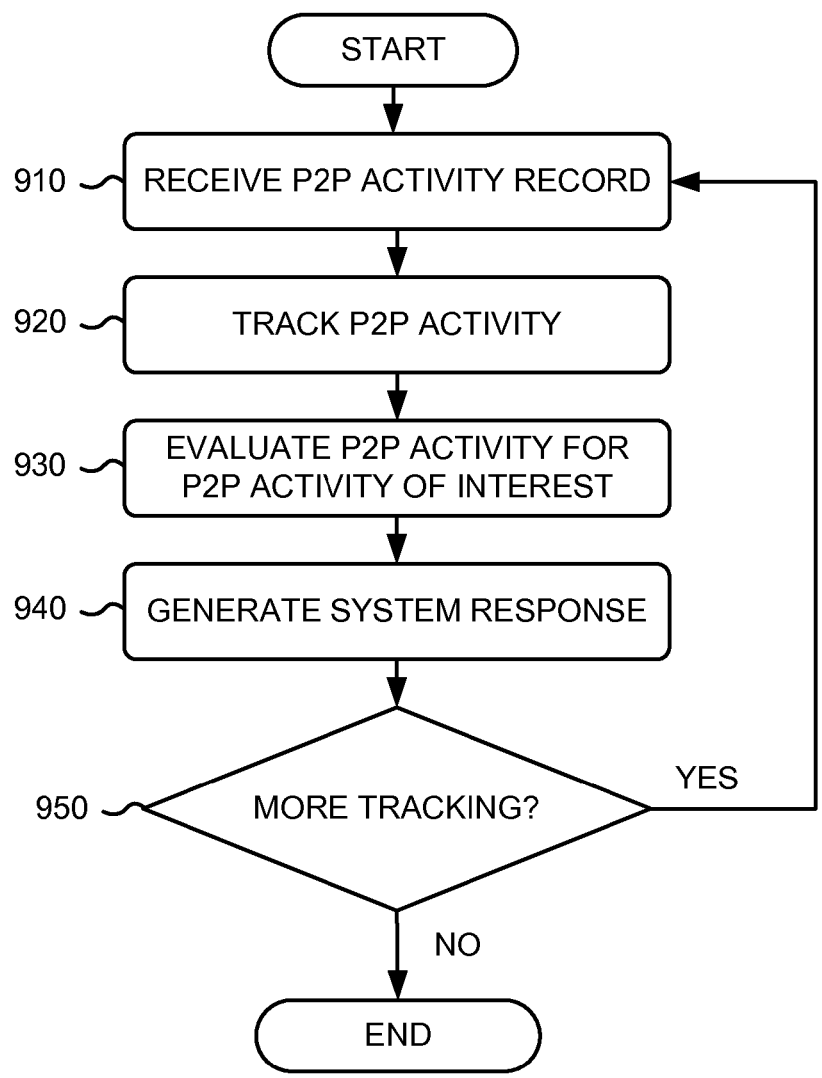
FIG. 9 is a flowchart diagram of an example process for identifying P2P activity of interest.

FIG. 9 is a flowchart of an example process 900 for identifying P2P activity of interest. In one or more implementations, process 900 may be performed by one or more components of PNMS 140. In some implementations, one or more blocks of process 900 may be performed by one or more other components/devices, or a group of components/devices, including or excluding PNMS 140.

Process 900 may include receiving a P2P activity record (block 910). For example, PNMS 140 may receive P2P activity records from one or more NMPs 130 distributed throughout a network 120. Additionally, or alternatively, PNMS 140 may store the P2P activity records in a memory 330, which may include a repository of P2P activity records. As discussed above, a P2P activity record may include a subscriber ID, a flow ID, and timing information.

P2P activity may be tracked (block 920). For instance, PNMS 140 may insert P2P activity records into one or more P2P activity maps depending on, for example, a subscriber ID, a flow ID and/or other information in each P2P activity record. In another example, PNMS 140 may track P2P activity by associating a P2P activity map with a subscriber ID and a flow ID of a particular P2P activity record and inserting a source ID, a destination ID, and timing information into the P2P activity map. In some implementations, a P2P activity record may be obtained directly from one or more NMPs 130, from NMP memory 230, and/or from a local memory 330. As discussed above, a P2P activity map may represent a sequence of P2P data flows between different UEs 110 at different times.

The P2P activity may be evaluated for one or more P2P activities of interest (block 930). For example, PNMS 140 may compare a P2P activity map with a P2P pattern of interest. As discussed above, the P2P pattern of interest may correspond to one or more P2P activities of interest, such as instant messaging, video conferencing, P2P file sharing, etc. Additionally, or alternatively, PNMS 140 may determine a probability or level of confidence with respect to whether a particular P2P activity is actually occurring in network 120. In some implementations, this may include identifying a probability or level of confidence based on the comparison of the P2P activity map and a P2P pattern of interest. In some implementations, this may also, or alternatively, include a consideration of other factors, such as the particular UE 110 associated with the P2P activity map, other UEs 110 involved, a network usage history corresponding to the particular UE 110 or other UE 110 involved, or the content being transferred.

Process 900 may include generating a system response (block 940). For instance, PNMS 140 may respond to P2P activity in a variety of ways, which may depend on the probability that a P2P activity of interest is actually occurring. For example, if the probability is very low (e.g., less than x %), PNMS 140 may respond by adding additional P2P activity records to the P2P activity map and reevaluating the P2P activity map (block 950—Yes). By contrast, if the probability is very high (e.g., greater than y %), PNMS 140 may, for example, respond by generating a high alert message associated with the P2P activity, notifying network 120, identifying other UEs 110 involved in the activity, prohibiting other P2P data flows with the same or similar content, modify the bandwidth of one or more UEs 110, or deciding whether to continue tracking the corresponding P2P activity (block 950). In one implementation, PNMS 140 may do one of these. In another implementation, PNMS 140 may do a combination of these.

While FIG. 9 shows a flowchart diagram of an example process 900 for identifying to P2P activity of interest, in other implementations, a process for identifying to P2P activity of interest may included fewer operations, different operations, differently arranged operations, or additional operations than depicted in FIG. 9.

FIG. 10 is a diagram of example data structures 1000 corresponding to one or more systems and/or methods described herein. In some implementations, one or more of data structures 1000 may correspond to one or more methods, processes, or operations executed by PNMS 140. In other implementations, one or more of data structures 1000 may correspond to one or more other components/devices, or a group of components/devices, including or excluding PNMS 140.

In contrast to FIGS. 7A-7D, data structures 1000 describe a scenario where, for example, PNMS 140 has inserted P2P activity records into a P2P activity map, compared the P2P activity map with a P2P pattern of interest, and determined that P2P activity of interest is not occurring. For example, at T1, PNMS 140 may determine that the P2P activity of interest probability is 1% since, at the time, there was only one record in the P2P activity map. At T2, the PNMS 140 may determine that the P2P activity of interest probability is 30% since the P2P activity records of T1 and T2 are almost identical to the corresponding entries in the P2P pattern of interest.

However, at T3, PNMS 140 may determine that the P2P activity of interest probability is only 10% since there is only one P2P activity record to insert into the P2P activity map at T3, demonstrating a significant difference between the P2P activity map and the P2P pattern of interest. At T4, PNMS 140 may determine that the P2P activity of interest probability is 0% because there is only one P2P activity record to insert into the P2P activity map at T4, increasing the already significant difference between the P2P activity map and the P2P pattern of interest. In some implementations, PNMS 140 may discontinue inserting P2P activity records in the P2P activity map since the P2P activity of interest probability is 0% at T4. However, in other implementations, PNMS 140 may continue inserting P2P activity records into the P2P activity map. Additionally, as discussed above, PNMS 140 may operate to respond in one or more additional ways to any of the P2P activity of interest probabilities of T1-T4.

FIG. 11 is a diagram of example data structures 1100 associated with one or more systems and/or methods described herein. In some implementations, one or more of data structures 1100 may correspond to one or more methods, processes, or operations executed by PNMS 140. In other implementations, one or more of data structures 1100 may correspond to one or more other components/devices, or a group of components/devices, including or excluding PNMS 140.

Data structures 1100 describe a scenario where, for example, PNMS 140 has inserted P2P activity records into a P2P activity map, compared the P2P activity map with a P2P pattern of interest, and determined that P2P activity of interest is probably occurring. For example, at T1, PNMS 140 may determine that the P2P activity of interest probability is 1% since, at the time, there is only one record in the P2P activity map. At T2, the PNMS 140 may determine that the P2P activity of interest probability is 10% since only one of the P2P activity records of T2 corresponds to the P2P pattern of interest.

At T3, PNMS 140 may determine that the P2P activity of interest probability is 35% since only two of the records of T3 correspond to the P2P pattern of interest at T3. Then, at T4, PNMS 140 may determine that the P2P activity of interest probability is 85% since all five of the UEs in T1-T3 (e.g. UE1-UE5) of the P2P activity map transmitted the same data set to five new UEs in T4. As such, while there are clear distinctions between the P2P activity map at T4 and the P2P pattern of interest at T4, the overall pattern of activity in the P2P activity map is fundamentally consistent with the general pattern of the P2P pattern of interest. In some implementations, PNMS 140 may discontinue inserting P2P activity records in the P2P activity map since the P2P activity of interest probability is 85% at T4. However, in other implementations, PNMS 140 may continue inserting P2P activity records into the P2P activity map. Additionally, as discussed above, PNMS 140 may operate to respond in one or more additional ways to any of the P2P activity of interest probabilities of T1-T4.

Accordingly, in one or more implementations, described herein, devices may be used to detect, manage, and/or prevent P2P activity in a network. NMPs 130 may monitor ongoing P2P data flows and generate P2P activity records that may be used by PNMS 140 to determine whether P2P activity of interest is actually occurring (e.g., P2P file sharing) and to respond to the P2P activity in a prompt and appropriate manner.

The foregoing description of implementations provides illustrations and descriptions, but is not intended to be exhaustive or to limit implementations described herein to the precise form disclosed. Modifications and variations are possible in light of the above teachings or may be acquired from practice of the implementations.

For example, while series of blocks have been described with regard to FIGS. 8-9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the implementations may be implemented as a "component" or "module" that performs one or more functions. These components or modules may include hardware, such as an ASIC or a FPGA, or a combination of hardware and software.

Even though particular combinations of features are recited in the claims and/or disclosed in the specification, these combinations are not intended to limit the implementations. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device, comprising:
a communication interface to receive a first peer-to-peer (P2P) activity record representing a first P2P data flow of P2P activity in a network, the first P2P data flow comprising content information communicated from a first user equipment device (UE) to a second UE via the network, the first P2P activity record comprising information identifying the first P2P data flow; and
a processor, connected to the communication interface, to:
insert the information identifying the first P2P activity record into a first P2P activity map, wherein the first P2P activity record comprises:
a subscriber ID and a flow ID, the subscriber ID comprising an identity of the first UE, and the flow ID comprising an identity corresponding to the content information of the first P2P data flow,
associate the first P2P activity map with the subscriber ID and the flow ID of first P2P activity record,
compare the first P2P activity map to a P2P pattern of interest,
determine a first P2P activity of interest probability based on the comparison of the first P2P activity map with the P2P pattern of interest, the first P2P activity of interest probability comprising a probability that P2P activity of interest is occurring in the network; and
generate a system response based on the first P2P activity of interest probability.

2. The network device of claim 1, where:
the first P2P activity record further comprises at least one of a source ID, a destination ID, or timing information.

3. The network device of claim 2, where,
when determining the first P2P activity of interest probability, the processor is to perform at least two of the following:
identify a P2P activity type corresponding to the P2P pattern of interest, access a P2P activity history corresponding to the P2P activity type, and determine a rate of occurrence for the P2P activity type based on the P2P activity history;
identify a P2P activity type corresponding to the P2P pattern of interest, access a P2P activity history corresponding to the subscriber ID, and determine a rate of occurrence of the subscriber ID being associated with the P2P activity type based on the P2P activity history;
identify a P2P activity type corresponding to the P2P pattern of interest, access a P2P activity history corresponding to the flow ID of the first P2P activity record, determine a rate of occurrence of the flow ID being associated with the P2P activity type based on the P2P activity history; or
identify a P2P activity type corresponding to the P2P pattern of interest, access a P2P activity history corresponding to the P2P activity type, identify peak activity times of the P2P activity type, and determine whether timing information of the first P2P activity record corresponds to peak activity times of the P2P activity type.

4. The network device of claim 2, where, when
generating the system response, the processor is to perform at least one of:
identify a P2P activity type corresponding to the P2P pattern of interest, identify a threat level associated with the P2P activity type, ascertain a level of network congestion in the network, and modify the threat level based on the current level of network congestion;
identify a P2P activity type corresponding to the P2P pattern of interest, access a P2P activity history corresponding to the P2P activity type, and determine a rate of occurrence for the P2P activity type based on the P2P activity history;

identify a P2P activity type corresponding to the P2P pattern of interest, access a P2P activity history corresponding to the subscriber ID, and determine a rate of occurrence of the subscriber ID being associated with the P2P activity type based on the P2P activity history; or identify a P2P activity type corresponding to the P2P pattern of interest, access a P2P activity history corresponding to the flow ID of the first P2P activity record, and determine a rate of occurrence of the flow ID being associated with the P2P activity type based on the P2P activity history.

5. The network device of claim 2, where, when generating the system response, the processor is to perform at least one of:

communicate an alert message to at least one network device, the alert message comprising a level of severity corresponding to the P2P activity, communicate a warning message to the first UE or the second UE, reduce a bandwidth corresponding to the first UE or the second UE, terminate network connections corresponding to the first UE or the second UE, update a P2P activity history with information corresponding to the P2P activity, prohibit P2P data flows involving the same or similar flow ID, expedite identification and evaluation of one or more other P2P activity maps, or determine whether to continue tracking the P2P activity.

6. The network device of claim 1, where the processor is to:

receive a second P2P activity record representing a second P2P data flow of the P2P activity in the network, the second P2P data flow comprising content information communicated from the second UE to a third UE via the network, where the content information of the second P2P data flow matches the content information of the first P2P data flow, the second P2P activity record comprising information identifying the second P2P data flow, determine that the information identifying the second P2P data flow matches the information identifying the first P2P data flow, insert the information identifying the second P2P activity record into the first P2P activity map to obtain an updated first P2P activity map, compare the first P2P activity map with the P2P pattern of interest, determine a second P2P activity of interest probability based on the comparison of the updated first P2P activity map to the P2P pattern of interest, the second P2P activity of interest probability comprising a probability that the first UE is participating in the P2P activity of interest, and generate a second system response based on the second P2P activity of interest probability.

7. The network device of claim 6, where:

the second P2P activity record comprises a subscriber ID and a flow ID, the subscriber ID comprising an identity of the second UE, and the flow ID comprising an identity corresponding to the content information of the second P2P data flow, and the processor is to:

associate the subscriber ID and the flow ID of the second P2P activity record with a second P2P activity map, insert the information identifying the second P2P data flow into the second P2P activity map, compare the second P2P activity map with the P2P pattern of interest, determine a third P2P activity of interest probability based on the comparison of the second P2P activity map with the P2P pattern of interest, the third P2P activity of interest probability comprising a probability that the second UE is participating in the P2P activity of interest, and generate a third system response based on the third P2P activity of interest probability.

8. The network device of claim 2, where the processor is to:

compare the first P2P activity map with multiple P2P patterns of interest that each corresponds to the P2P activity of interest, each of the multiple P2P patterns of interest comprising a distinct series of P2P data flows, and where the first P2P activity interest probability is based on the comparison of the first P2P activity map to the multiple P2P patterns of interest.

9. A method, comprising:

receiving, by a network device, a peer-to-peer (P2P) activity record comprising information identifying a P2P data flow of P2P activity in a network, the P2P data flow comprising content information communicated from a first user equipment device (UE) to a second UE via the network, wherein the information identifying the P2P data flow comprises:

a subscriber ID that comprises an identity of the first UE, and a flow ID that comprises an identity corresponding to the content information of the P2P data flow;

determining, by the network device, whether any of a plurality of P2P activity maps are associated with the information identifying the P2P data flow;

when a P2P activity map associated with the information identifying the P2P data flow is identified, inserting the information identifying the P2P data flow into the identified P2P activity map, and when a P2P activity map associated with the information identifying the P2P data flow is not identified, associating the information identifying the P2P data flow with a new P2P activity map, and inserting the information identifying the P2P activity record into the new P2P activity map.

10. The method of claim 9, further comprising:

searching the plurality of P2P activity maps for P2P activity maps associated with the flow ID; and when P2P activity maps associated with the flow ID are identified, inserting information identifying the P2P data flow into the P2P activity maps associated with the flow ID.

11. The method of claim 10, further comprising:

comparing each of the P2P activity maps associated with the flow ID with at least one P2P pattern of interest, the at least one P2P pattern of interest comprising information associated with a sequence of data flows;

determining a P2P activity of interest probability, for each of the P2P activity maps associated with the flow ID, based on the comparison of each of the P2P activity maps associated with the flow ID with the at least one P2P pattern of interest, the P2P activity of interest probability comprising a probability that P2P activity of interest is occurring in the network; and generating a system response for each of the P2P activity maps associated with the flow ID based on the P2P activity of interest probability for each of the P2P activity maps associated with the flow ID.

12. The method of claim 11, where:

determining the P2P activity of interest probability for each of the P2P activity maps associated with the flow ID is based on at least two of:

identifying a P2P activity type corresponding to the P2P pattern of interest, accessing a P2P activity history corresponding to the P2P activity type, determining a rate of occurrence for the P2P activity type based on the P2P activity history;

identifying a P2P activity type corresponding to the P2P pattern of interest, accessing a P2P activity history corresponding to the subscriber ID for each of the P2P activity maps associated with the flow ID, and determining a rate of occurrence of the subscriber ID being associated with the P2P activity type;

identifying a P2P activity type corresponding to the P2P pattern of interest, accessing a P2P activity history corresponding to the flow ID, determining a rate of occurrence of the flow ID being associated with the P2P activity type; or identifying a P2P activity type corresponding to the P2P pattern of interest, accesses a P2P activity history corresponding to the P2P activity type, identifying peak activity times of the P2P activity type, and determine whether timing information of the P2P activity record corresponds to peak activity times of the P2P activity type.

13. The method of claim 11, where:

generating the system response is also based on at least one of:

identifying a P2P activity type corresponding to the P2P pattern of interest, identifying a threat level associated the P2P activity type, ascertaining a level of network congestion in the network, and modifying the threat level associated with the P2P activity type based on the current level of network congestion;

identifying a P2P activity type corresponding to the P2P pattern of interest, accessing a P2P activity history corresponding to the P2P activity type, determining a rate of occurrence for the P2P activity type based on the P2P activity history corresponding to the P2P activity type;

identifying a P2P activity type corresponding to the P2P pattern of interest, accessing a P2P activity history corresponding to a subscriber ID for each of the P2P activity maps associated with the flow ID, and determining a rate of occurrence of each subscriber ID being associated with the P2P activity type; or identifying a P2P activity type corresponding to the P2P pattern of interest, accessing a P2P activity history corresponding to the flow ID, determining a rate of occurrence of the flow ID being associated with the P2P activity type.

14. The method of claim 9, where:

generating the system response corresponding to each of the P2P activity maps comprises at least one of:

communicating an alert message, corresponding to the P2P activity, to at least one network device, the alert message comprising one of a plurality of levels of severity, communicating a warning message to the first UE or the second UE;

reducing a bandwidth corresponding to the first UE or the second UE;

terminating network connections corresponding to the first UE or the second UE;

updating a P2P activity history with information corresponding to the P2P activity;

prohibiting P2P data flows involving the same or similar P2P activity record information;

expediting identification and evaluation of one or more P2P activity maps; or determining whether to continue tracking the P2P activity.

15. A method, comprising:

monitoring, by a network device, a first peer-to-peer (P2P) data flow, the first P2P data flow comprising content information communicated from a first user equipment device (UE) to a second UE via a network;

obtaining, by the network device, a subscriber identifier (ID) of the first P2P data flow, the subscriber ID comprising an identity of the first UE;

producing, by the network device, a flow ID of the first P2P data flow, based on the content information of the first P2P data flow;

identifying, by the network device, timing information of the first P2P data flow, the timing information comprising a time associated with when the first P2P data flow was communicated by the first UE;

creating a first P2P activity record corresponding to the first P2P data flow, the first P2P activity record comprising the subscriber ID of the first UE, the flow ID of the first P2P data flow, and the timing information of the first P2P data flow;

mapping the first P2P activity record to at least one P2P activity map; and communicating the first P2P activity record to a network management server via the network.

16. The method of claim 15, where:

obtaining the subscriber ID of the first P2P data flow comprises:

identifying a source address of the first P2P data flow, the source address corresponding to the first UE, communicating the source address to a network authentication server, and receiving the subscriber ID of the first P2P data flow from the network authentication server.

17. The method of claim 16, further comprising:

obtaining a second subscriber ID of the first P2P data flow, the second subscriber ID comprising an identity of the second UE, and the obtaining of the second subscriber ID of the first P2P data flow comprises:

identifying a destination address of the P2P data flow, the destination address corresponding to the second UE, communicating the destination address to the network authentication server, and receiving the second subscriber ID of the first P2P data flow from the network authentication server; and including the second subscriber ID in the first P2P activity record prior to communicating the first P2P activity record to the network management server.

18. The method of claim 15, further comprising:

monitoring a second P2P data flow, the second P2P data flow comprising content information communicated from the second UE to a third UE via the network, the content information of the second P2P data flow matching the content information of the first P2P data flow;
obtaining a subscriber ID of the second P2P data flow, the subscriber ID comprising an identity of the second UE;
producing a flow ID of the second P2P data flow, based on the content information of the second P2P data flow, the flow ID of the second P2P data flow matching the flow ID of the first P2P data flow;
identifying timing information for the second P2P data flow, the timing information comprising a time associated with when the second P2P data flow was communicated by the second UE;
creating a second P2P activity record corresponding to the second P2P data flow, the second P2P activity record comprising the subscriber ID of the second UE, the flow ID of the second P2P data flow, and timing information of the second P2P data flow; and
communicating the second P2P activity record to the network management server via the network.

19. The method of claim 15, further comprising:
receiving an alarm message from the network management server, the alarm message comprising a command to expedite creation of P2P activity records corresponding to the flow ID of the first P2P data flow; and
allocating additional system resources to expedite creation of P2P activity records corresponding to the flow ID of the first P2P data flow.

20. A method, comprising:
monitoring, by a network device, a peer-to-peer (P2P) data flow, the P2P data flow comprising content information communicated from a first user equipment device (UE) to a second UE via a network;
identifying a source address of the P2P data flow, the source address corresponding to the first UE;
communicating, by the network device, the source address to a network authentication server of the network;
receiving, by the network device, a subscriber ID comprising an identifier (ID) of the first UE;
producing, by the network device, a flow ID of the P2P data flow, based on the content information of the P2P data flow;
identifying, by the network device, timing information of the first P2P data flow, the timing information comprising a time associated with when the P2P data flow was communicated by the first UE;
creating, by the network device, a P2P activity record corresponding to the P2P data flow, the P2P activity record comprising the subscriber ID of the first UE, the flow ID of the P2P data flow, and the timing information of the P2P data flow;
mapping the P2P activity record into one or more P2P activity maps; and
communicating, by the network device, the P2P activity record to a network management server via the network.

* * * * *